July 17, 1928.
C. H. SPENCER
1,677,153
METHOD FOR TREATING SOILS TO PROMOTE PLANT GROWTH
Filed Feb. 11 1926
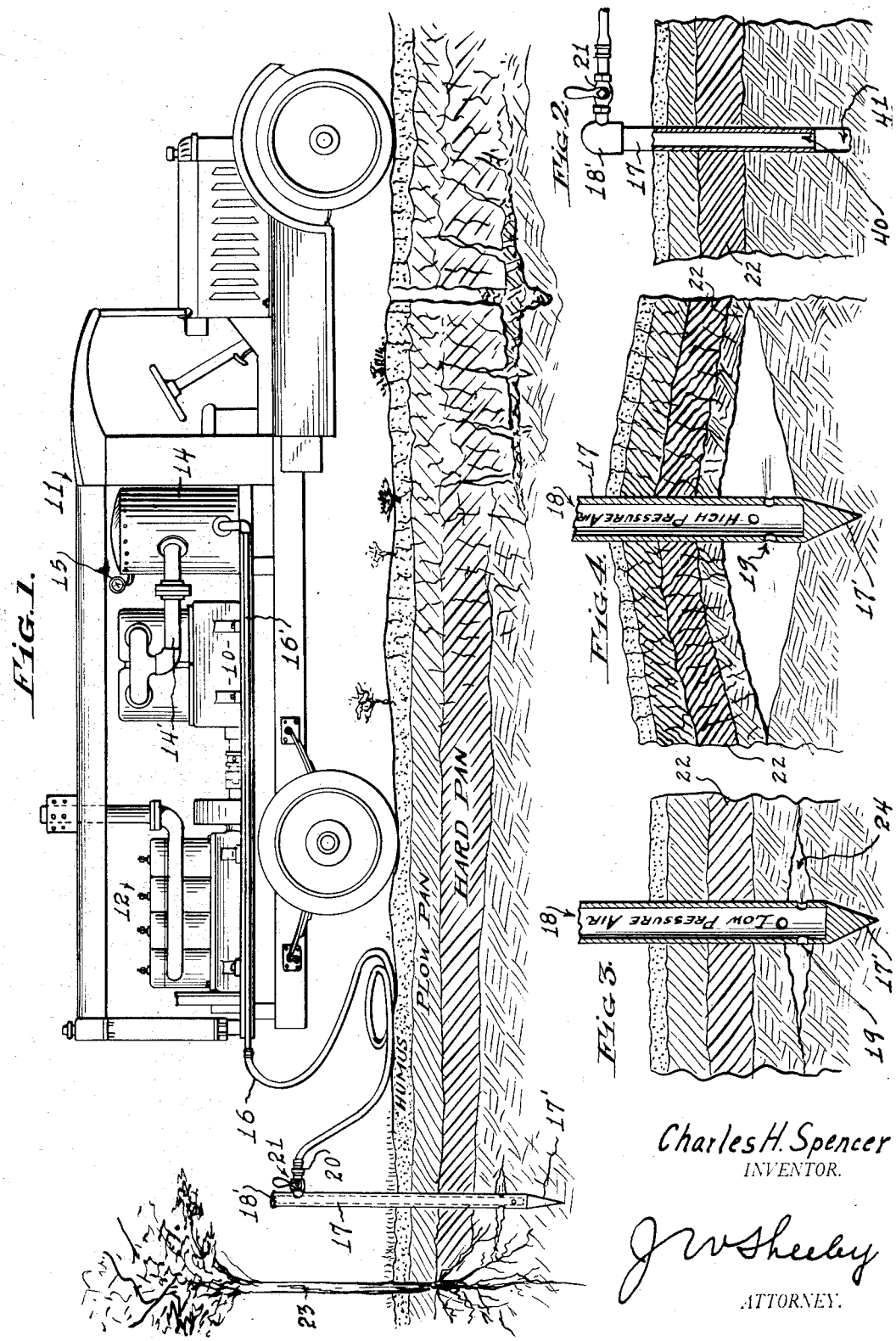
Charles H. Spencer
INVENTOR.
J W Sheely
ATTORNEY.

Patented July 17, 1928.

1,677,153

UNITED STATES PATENT OFFICE.

CHARLES H. SPENCER, OF LOS ANGELES, CALIFORNIA.

METHOD FOR TREATING SOILS TO PROMOTE PLANT GROWTH.

Application filed February 11, 1926. Serial No. 87,673.

The present invention relates to the treatment of soils for the promotion of plant growth, and pertains more particularly to the treatment of compact soils.

It is a recognized fact that the principal cause of poor plant growth is the lack of a proper degree of porosity of the soil in which the plants are rooted. Such lack of porosity prevents the proper infiltration of both air and water necessary to the plant's growth, and causes the retention of foul gases in the soil. Many theories and beliefs are extant as to the benefits of ample supplies of pure air in the soil adjacent the roots, and likewise as to the advantages and reasons for keeping the soil in a porous or well broken condition, but the fact is admitted, by practically all horticulturists and agriculturists, that healthy plant growth can be had only when the soil is in such condition that the infiltration of fresh atmospheric air, and of water is possible.

In addition to the above it is generally conceded by all those skilled in the art, that the existence of fresh air, adjacent the roots of plants, is necessary to the plant's growth, although it is not definitely known whether the air is most beneficial to the roots directly, or whether it aids the activities of the nitrifying bacteria of the soil, but it is a well recognized fact that closely compact soil, or even suitably porous soil, covered by standing water is not conducive to healthy plant growth.

Deep plowing and frequent cultivating are the only known practical methods for breaking up the soil and subjecting it to the beneficial action of new and fresh air.

Crops and trees set out in virgin soil invariably flourish for a time and later become decadent because constant action of rain water and irrigating water, washing down through the porous upper layers of soil, settle the finer and more soluble particles of earth into a closely compact strata, generally known as hard pan. Hard pan is practically impervious to atmospheric air and to water. Long lived growths, such as trees, are difficult of proper cultivation without injury to the roots. In grooves, the only known method of treatment is to subsoil to a depth below the surface. This lets in a limited amount of air and water, but subsoiling cannot be carried on close to the tree or its roots and is therefore of limited benefit.

Hard pan, or relatively impervious stratas, may form even as a result of one or two heavy rains or surface irrigations, and there is no known method for breaking up such formations while the plants are growing. Deep seated hard pans, in the case of trees, choke the roots, and where the roots go to considerable depths for water, they penetrate the low hard pans into a soil which is deficient in air and which is charged with foul gases.

Even where very deep plowing is resorted to annually, the fact remains that before the plants are matured, the soil becomes so compact near the surface as to prevent proper and natural infiltration of air and water to the soil in which they are rooted.

It is therefore one of the primary objects of the invention to provide improved methods and means for breaking the ground, and particularly the deeper hard pans, at any desired time, and particularly after planting, or in the case of orchards, to break the soil and hard pans without injury to the trees and their roots.

Another, and perhaps equally important object of the invention, is to provide improved methods and means for forcing foul air out of the ground, and for causing new air to reach the roots.

Another object of the invention is to provide for breaking, and rendering pervious, the deep lying hard pans which cannot be reached by ordinary plowing.

As a means for aerating soil, it has been proposed to lay pipes under ground, with openings therein, and to blow air into these pipes, so that it may escape through the openings and percolate through the ground to expel the foul gases, and to provide new oxygen and nitrogen for the soil. Such method is impractical in that the air soon finds channels through the ground which offer least resistance to its escape, and these channels are finally enlarged by the escaping air until all the air introduced readily escapes by way of such channels without being compelled to spread throughout the ground. In fact, by far the great majority of technical persons will state with conviction, that air forced into the ground at any permanent point will find eventually, or create, a line of least resistance of escape, and cannot be compelled to spread through the ground.

Another object of the invention is to provide for breaking the ground, from an appreciable depth upwardly, to, and including the surface, so that standing water or subsequent rains and irrigations will readily sink into the ground. From observations of my methods, as well as observations of nature's methods, I have concluded that ground maintained in a suitable condition of porosity will be constantly reaerated by such rain or irrigation. This is due to the fact that the great density of water permits of its going into the interstices of the earth and replacing the foul gases. Subsequently, when the water is evaporated or taken in by the plants, the voids created are filled with atmospheric air forced downwardly into the voids by atmospheric pressure.

Another object of the invention is to provide for quite evenly aerating large areas with minimum expenditure.

Still other objects and advantages of my invention will appear hereinafter.

My invention resides in the provision of a method, rather than any specific device, for breaking and aerating ground, but in order to carry out this method, certain apparatus is required, although it will be apparent, hereinafter, that there are numerous forms of known apparatus and devices which may be employed to carry out my invention. However, to more clearly explain my invention I have illustrated one form of apparatus, and some devices for carrying out the method.

It is to be understood that I do not limit myself to any particular device, except within the scope of the appended claims.

In the said drawings;

Figure 1 is a diagrammatic view of an apparatus suitable for carrying out my improved methods.

Figure 2 is a view in vertical section of a modification of a part thereof.

Figure 3 is a view in cross section, illustrating one of the steps in my method.

Figure 4 is a view in section, illustrating another subsequent step which may be employed in further carrying out the complete method, which is about to be described.

In carrying out my invention, I employ a fluid in gaseous form, such as air, or of course, an inert gas, or beneficially active gases other than air may be employed.

For most beneficial results, and particularly to carry out all the foregoing objects of the invention, the gas is introduced, with proper head or pressure, at points below the surface; preferably below the first impervious layer, or at least below the first few inches of soil. I have found that migratory dust and the humus generally renders the top of the ground less pervious than the immediate underlying layers, and usually there is a hard pan well below the more porous overlying earth. Therefore, the air is to be injected, at a point to which, or below which water and, or, air should percolate. In the case of a distinct hard pan or impervious layer, the air is preferably introduced below such impervious layer. In the case of crops, or in the case of lawns, where the roots are closely interlaced, and form a mat or sod of earth and roots, the air should be introduced at least below such sod.

The apparatus shown in Figure 1, comprises an air compressor 10, mounted on a truck 11, and driven by an internal combustion engine 12. The compressor discharges to a tank 14, and in this instance the tank is fitted with the pressure gauge 15. From the tank there extends a long flexible conduit, or common air hose, 16. In conformance with a salient feature of the invention, I provide a spud 17, adapted to be inserted or driven into the ground. The spud illustrated in Fig. 1 is provided with a pointed end 17', and a bore 18 closed at the upper end, as at 18'. At the lower end, said spud is provided with a plurality of apertures 19 which open out laterally. The hose is connected to the spud by a coupling 20. A valve 21 is placed between the hose and the spud to regulate or shut off the supply of air.

In carrying out my improved method with the apparatus described, the spud is driven into the ground to a suitable depth, preferably more than one foot, and usually about three feet. By driving the spud the soil is packed around the same and acts as a seal to prevent air from escaping around the spud. Most soils requiring treatment by my method are characterized by a relatively impervious layer or hard pan 22, usually deeper than the plow has been able to reach. In the case of a tree 23, it is not possible to plow close to it without injury to the roots, and therefore, particularly in the case of irrigated groves, the soil is closely packed and comparatively impervious from the humus downwardly to an appreciable depth. To obtain most beneficial results, in such cases, the spud should enter, or even pass through the first impervious layer.

In treating large areas or acreage, several spuds may be driven into the ground, and a plurality of hoses may be employed, or several spuds may be employed with one hose, in which case one man may take care of placing and removing the spuds, while another man may take care of the hoses and valves.

The compressor is operated, preferably, continuously, and air flows through the tank and hose to the spud. The apertures in the spud should be of slightly reduced total area as compared to the area of flow through the smallest part of the hose or the valve, so that the air issues from the apertures at appreciable velocity. When the air is first turned on it is preferable to open the valve slowly, as the tank may contain air at an excessive pressure. When the valve is being opened, the surface of the ground should be watched to see that the air is not admitted at sufficient pressure to cause a breaking or buckling of the ground.

Finally the pressure in the tank drops until the air is going into the ground as rapidly as it is being delivered to the tank, and the entire pneumatic system reaches a state of constant pressure. Some of the pressure of the air is of course required for moving the air through the hose, while another pressure difference is required for accelerating the air through the orifices of the spud. When the air is flowing continuously into the ground, the pressure in the cavities immediately surrounding the orifices is only slightly greater than atmospheric pressure.

If the pressure around the orifices is very great, the ground adjacent the nozzle will be caused to bulge visibly and objectionable crevices may form to allow the air to escape without properly permeating the ground. By admitting the air slowly until the valve is wide open and the ground is taking the air properly, such premature breaking of the ground is obviated. In the case of a spud one and one-half inches in external diameter, I have been able to introduce 350 cubic feet of free air per minute in such manner that the air travels great distances under ground without escaping unduly at any given point. In sandy soils, for example, I find that the pressure with a spud of the size just mentioned, is only about three pounds per square inch greater when the spud is in the ground than when it is discharging freely to the open air. This indicates the small pressure difference required to put the air into the ground in soil of this kind. The above mentioned amount of air was injected with the lower end of the spud about three feet below the surface. However, the pressure carried in the tank is always well in excess of three pounds per square inch, in order to overcome the resistance of the holes, and to give velocity to the air escaping from the orifices. In actual operation I have carried from 20 pounds to as high as 80 pounds pressure in the tank, with no pressure regulator between. Obviously, should the soil at any time offer great resistance, the entire pressure of 80 pounds, in the latter instance, would be available to overcome this resistance. Contrary to general opinion, this pressure does not act to blow the soil up from around the spud. Whenever any high resistance is created by the soil, the pressure merely acts to overcome that resistance and open up crevices adjacent the spud, to allow the air to permeate the ground.

In all instances, I have found it advisable to always carry a tank pressure in excess of that represented by the weight of the soil to that depth, so that the excess pressure will be brought to bear against any temporary resistance.

As the air issues from the orifices at appreciable velocity it keeps the earth from closing the apertures and forms small cavities or crevices, such as shown, around the spud, and the air enters the interstitial spaces of all the exposed earth. The air travels laterally underground, even when there is no hard pan, apparently more rapidly than it travels vertically. A hole (not shown) may be dug near the spud and filled with water to a slight depth, or the walls of the hole may be sprinkled with water. A similar hole may be prepared at a greater distance. Bubbles appear in the water as the air and stale gases are driven from the ground into the hole, and the hole in closer proximity does not show much greater escape of air or gas than does the hole which is remote from the spud. Holes prepared thirty feet away from the point of injection show escape of air and gas after a very short period of injection. Immediately the air is turned off at the nozzle, such escape is seen to cease. If the surface of the ground is sprinkled at varying distances from the nozzle, it will be seen that some air, or the gases expelled by the air below, escapes upwardly through the ground adjacent the spud, but a similar escape will be noted several feet away, as well.

By running the compressor continuously, air may be injected for a long period of time. When it is calculated that a sufficient amount of air has been injected, the spud is moved to a new location. If, for instance, the spud is moved ten feet away each time to a new location, this means that each injection should provide air to aerate one hundred square feet of soil three feet deep. Since the air or gas content of soil seldom exceeds one third of its total volume, it will be seen that one hundred cubic feet of air per minute will suffice.

Since the air is injected well below the surface, it is introduced to the ground below the gases which occupy the interstices adjacent the surface. Therefore, the first escape noted represents foul gases, rather than air, and when it is obvious that air is escaping and the ground adjacent the spud is saturated with fresh air, the spud should be moved to a new location.

In the case of a quite impervious layer, air injected below this layer, or hard pan, will travel great distances and remain thereunder, until another step in my method is employed to break the hard pan. The same is true in the case of lawns. Much of the lawn surface, particularly when wet, will hold the air down, but limited areas at various points will allow the gases to be driven out by the new air.

While the compressor is running and the air is entering the ground at a maintained pressure, and before moving the spud, the ground may be broken or "internally plowed" by the following procedure:—The valve at the spud is closed. The pressure in the hose and tank is just that sufficient to inject the air properly into the ground, but as soon as the valve is closed, the pressure in the tank and hose increases. Shortly, in the space of a few seconds, the valve is opened quickly. Air at a high pressure rushes rapidly into the cavities and crevices around the spud and fills them with high pressure air more rapidly than this air can expand and disseminate through the adjacent soil. The previous injection of air has driven lighter particles upwardly, so that the upper stratas are quite well sealed against sudden upward escape of air. The interstices are filled with fresh air at, or above, atmospheric pressure. The high pressure air travels laterally and exerts a pressure upon the overlying earth. Since the weight of the ground above is less than one pound per square inch per foot deep, this excess pressure will cause the overlying ground to rise, and the surface will bulge visibly. This of course causes enlargement of the cavities and possible elongation of the crevices. The valve is closed again and the air pressure again built up, preferably to an even higher pressure than before. Sudden release of this pressure fills the increased crevices and cavities and causes a farther reaching bulging of the earth. When this is repeated a few times, according to the nature of the soil, the ground is greatly loosened, broken and provided with myriads of cavities.

In the case of sudden injection of high pressure air below hard pan, the results are even more noticeable, and the hard pan is broken by myriads of clefts. After the ground is so broken, it is of course wasteful of air to attempt to inject air for the further permeation of the soil, it being preferable to break the ground only after it has been aerated.

Obviously, ground so treated is filled with fresh air, the foul gases are driven off, and the ground is highly receptive to water, even below the previously impervious layer. The benefits of such treatment in plant growth can be readily appreciated. Grass, alfalfa, and similar crops show almost immediate and surprising results. Trees treated, particularly close to the roots, show renewed and vigorous growth in a few weeks. Surface irrigated lands, which shed the major portion of irrigation water, will be found to absorb water at a surprising rate after being aerated by my process. Even clods or lumps of earth adjacent the surface, after being aerated in the above described manner, slack and crumble rapidly, leaving a more porous and hygroscopic mass.

The spuds are moved from point to point at timed intervals, and at each point a given amount of air is injected so that maximum area may be covered efficiently. By observing the difference between the pressure required to force air through a given spud to the open air, and the pressure required to force air out of the spud while it is embedded in the ground, the pressure required to cause the air to permeate the ground is determined. In designing compressor outfits and spuds, the areas of flow to the spuds and hose should be proportioned accordingly, allowing for a slight excess pressure to force the air through the hose and to give reasonable velocity to the air escaping from the orifices of the spuds, and to allow for overcoming any temporary resistance.

In the modified form of spud, the end is open, as at 40. This spud may be driven into some grounds readily, by allowing the air to escape freely from the end thereof, while the spud is being forced by hand into the ground. The air blast blows a hole ahead of the spud. When the hole is down the required depth, the air is turned off and the loose earth around the spud is tamped down by foot pressure, only. Then the air is turned on slowly at first until the pressure comes down to that at which it has been found advisable to operate.

In considering the possibilities of injecting air into the ground, it should be realized that the particles of earth cohere to each other. Even should air immediately adjacent the spud exert an upward pressure in excess of the super-imposed weight of the earth above it, the pressure will not necessarily raise the ground immediately above it. This is because, when a given area of ground is raised it tends to adhere to more remote portions which hold it down. With a spud of the type just described, having an open end of $\frac{9}{16}$th inch diameter, 350 cubic feet of air per minute, or more, may be injected without its blowing the soil away from around the spud. Operating under such conditions, it is frequently observed that by sprinkling the ground, bubbles of water will form on the surface and will remain for long intervals without bursting. This fact indicates that the pressure of air in the ground immediately under the surface, under the operating conditions just mentioned, is not high.

Since the surface is somewhat sealed by dust, humus and the like, it is not improbable that injected air will descend well below the spud as readily, and perhaps more readily, than it will travel upwardly. This fact is also due to the unlimited depths of voids which exist in the ground below the spud.

When the soil is broken and loosened by my method, it absorbs water rapidly. The plants and nitrifying bacteria in the soil will eventually use up the new air injected. However, water percolating down through the well broken soil will displace the subsequently formed foul gases and will fill the voids. When this water is taken by the plants, or is evaporated, new atmospheric air will rush in to take its place, and thus nature will carry on continued aeration as long as I, by my method, keep the ground in proper condition.

When subsequent rains and irrigation again pack the soil and cause it to be formed into a hard pan, it is again necessary to employ the above described methods. Obviously, I can "internally plow" and aerate ground which is filled with roots, and I can even treat ground in which tender plants have just sprouted, without injury to same.

Earth at a depth where water cannot penetrate, due to compact layers of hard pan, is of course quite dry. This mass of earth is composed of myriads of grains lying upon each other with interstitial spaces between. Air has so little resistance in traveling through a small orifice that it will disseminate through the interstitial spaces almost as freely as if the particles of earth were not there. In other words, since the earth near the surface is far from being solid, it contains air or gases. If a room full of air is filled with dry earth, 25 per cent of the air originally in the room will remain. Air jets of reasonable velocity will direct air through the interstices as readily in one direction as in another. As far as atmospheric pressure differences are concerned, it will be understood that the atmospheric pressure difference represented by a difference of elevation of six feet, for example, is negligible. Air injected into the exact center of the earth filled room, if injected downwardly, will travel downwardly more readily than upwardly. After the air injection is discontinued, then of course the air will tend to equalize throughout the room. On this theory, I believe it will be most efficient to inject the air downwardly, or laterally into the earth. No matter how deep the air may go, it will eventually equalize with the atmospheric air, but downward or lateral injection provides for saturating the ground more quickly and provides for storing greater quantities of fresh air in the ground in a given time.

It will be apparent now that my method provides air in all the interstitial spaces of the ground, whereas subsoiling, plowing, harrowing, and the like, do not provide air to all the interstices, but only to the surfaces of the resultant lumps of earth.

I claim:

1. The method for treating soils; which method consists in introducing air to the ground at a point below the surface thereof at moderate pressure until the adjacent ground is charged with air, storing up a volume of higher pressure, air, and suddenly releasing the stored volume of high pressure air into the charged ground at a rate sufficient to cause a visible swelling of the surface thereof.

2. The method for internally disrupting compact soil; which method consists in providing a hole in the ground, introducing air to said hole to cause its dissemination through the adjacent soil to open up lateral crevices, and subsequently admitting successive limited charges of high pressure air to said hole to cause visible swelling of the surface of the ground.

3. The method for internally disrupting soil; which method consists in providing a source of high pressure air, providing a hole in the ground, admitting air from said source to said hole in successive defined injections; each successive injection admitting the air at a higher volumetric rate.

4. The method of treating large areas of soil to promote plant growth; said method consisting in providing a plurality of spaced holes in the ground, introducing a volume of air to one of said holes at a slow rate to permit of its dissemination through the ground without visible movement on the part of the surface of said ground, subsequently introducing air to said hole for short defined periods at a considerably higher volumetric rate to cause visible movement on the part of the surface of the ground adjacent the hole, and repeating the above mentioned steps in the order named, in another hole; the said volume of air introduced to each hole, in terms of cubic feet of free air, being at least one quarter that of the square of the distance in feet between said holes multiplied by the average depth of each hole in feet.

5. The method for breaking soil for the infiltration of air, water and the like; which method consists in providing a hole in the ground to a given depth, providing a volume of high pressure gas; the pressure of said gas being several times that represented by the weight of the soil per square inch to the depth of the hole, slowly admitting some of the gas to said hole at such rate that the gas enters the ground before building up a pressure in said hole in excess of that represented by the weight of the ground per square inch to the depth of the hole, and subsequently allowing the high pressure gas to escape to the hole at a considerably increased rate.

CHARLES H. SPENCER.